United States Patent [19]
Nakaya et al.

[11] Patent Number: 6,112,205
[45] Date of Patent: *Aug. 29, 2000

[54] DATA PROCESSING EQUIPMENT AND METHOD FOR CLASSIFYING DATA INTO CLASSES IN ACCORDANCE WITH A PLURALITY OF THRESHOLDS FOR QUANTIZING DATA

[75] Inventors: Hideo Nakaya; Tetsujiro Kondo, both of Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/349,297

[22] Filed: Jul. 7, 1999

Related U.S. Application Data

[63] Continuation of application No. 08/891,311, Jul. 10, 1997, abandoned.

[30] Foreign Application Priority Data

Jul. 18, 1996 [JP] Japan ................................ 8-189163

[51] Int. Cl.[7] ..................................................... G06F 17/30
[52] U.S. Cl. .............................. 707/7; 348/317; 348/420; 348/390
[58] Field of Search ................................ 707/7; 348/417, 348/420, 390

[56] References Cited

U.S. PATENT DOCUMENTS

| | | | |
|---|---|---|---|
| 3,858,180 | 12/1974 | Spanjersberg | 340/146.3 |
| 4,581,638 | 4/1986 | Chiariglione et al. | 358/135 |
| 4,695,971 | 9/1987 | Reimann | 364/769 |
| 4,860,355 | 8/1989 | Copperi | 381/36 |
| 4,992,868 | 2/1991 | Holtz | 348/417 |
| 5,136,663 | 8/1992 | Nishio | 382/56 |
| 5,196,931 | 3/1993 | Kondo | 348/420 |
| 5,229,862 | 7/1993 | Takahashi et al. | 386/109 |
| 5,241,381 | 8/1993 | Kondo | 348/390 |
| 5,351,047 | 9/1994 | Behlen | 341/67 |
| 5,481,554 | 1/1996 | Kondo | 371/53 |
| 5,598,214 | 1/1997 | Kondo et al. | 348/414 |
| 5,619,693 | 4/1997 | Troisi | 707/7 |
| 5,651,026 | 7/1997 | Lin et al. | 375/240 |
| 5,699,119 | 12/1997 | Chung et al. | 348/405 |
| 5,732,160 | 3/1998 | Katoh | 382/263 |
| 5,818,974 | 10/1998 | Kimura et al. | 382/270 |
| 5,825,313 | 10/1998 | Kondo et al. | 341/67 |
| 5,850,261 | 12/1998 | Kondo et al. | 348/420 |

OTHER PUBLICATIONS

Chang et al., Pipeland Recursive Digital Filters: Clustered LooK–Ahead and Scattered Look–Ahead Techniques, IEEE, pp. 89–92, Jun. 1994.

Chang et al., Ultra High Speed Digital Filtering Algorithm for Video Signal Processing, IEEE, pp. 121–124, 1995.

Chang et al., Scallable Video Coding using 3–D Subband Velocity Coding and Multirate Quantization, IEEE, pp. 574–577, Apr. 1993.

Donald E. Knuth, The Art of Computer Programming: vol. 3/ Sorting and Searching. Addison–Wesley Publishing Company (Reading, Massachusetts, Jan. 1973, p. 141–145, 251–255.

Examiner's Exhibit A, Jan. 3, 1999, p. 1.

*Primary Examiner*—Thomas G. Black
*Assistant Examiner*—Frantz Coby
*Attorney, Agent, or Firm*—Frommer Lawrence & Haug, LLP; William S. Frommer; Gordon Kessler

[57] ABSTRACT

Pixel data are sequentially compared in the circuit blocks 41A through 47A, smaller pixel data are supplied to the circuit blocks 51B through 54B, and further, smaller pixel data are supplied to the circuit blocks 71B, 72B. A smaller one of the pixel data supplied to the circuit blocks 71B, 72B is supplied to the circuit block 91B, thus determining the minimum value of pixel data. The maximum value of pixel data can also be obtained in the same manner. On the basis of these data, the thresholds for generating class codes can be obtained. Thus, a hardware of a simple construction can classify the pixel data into classes.

8 Claims, 5 Drawing Sheets

DATA PROCESSING EQUIPMENT AND METHOD FOR CLASSIFYING DATA INTO CLASSES IN ACCORDANCE WITH A PLURALITY OF THRESHOLDS FOR QUANTIZING DATA

This application is a continuation of application Ser. No. 08/891,311, filed Jul. 10, 1997 now abandoned.

BACKGROUND OF THE INVENTION

1. Field of the Invention

The present invention relates to a data processing equipment and a method of the same, more specifically to a data processing equipment and a method of the same suitable for use in, for example, the definition creation technique that generates the HD (High Definition) TV pictorial image from the SD (Standard Definition) TV pictorial image, the adaptive decoding in the compression coding, and the space-time thinning interpolation and suchlike.

2. Description of Related Art

Figure 4:
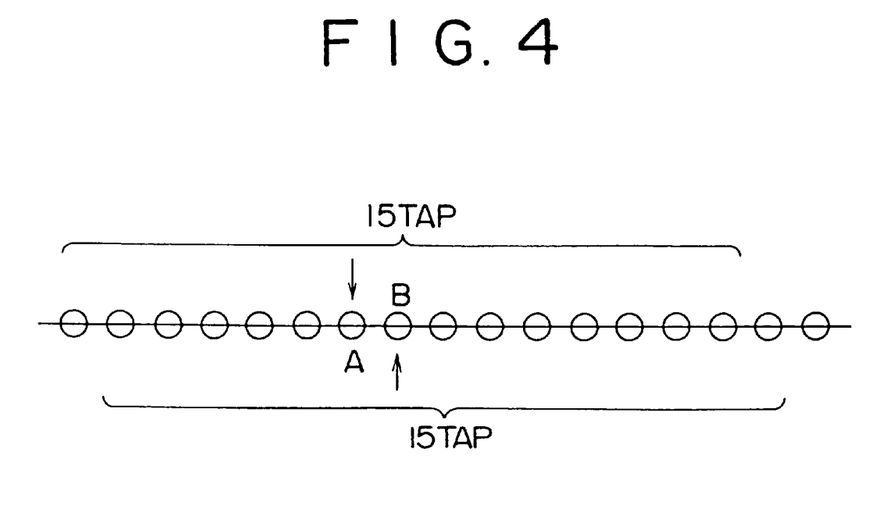
FIG. 4 is a chart showing an example of pixels forming classes of 15 horizontally arrayed taps.

The class classifying technique employing the ADRC (Adaptive Dynamic Range Coding) calculates a class every time at each pixel, while shifting taps forming a class at each pixel. As shown in FIG. 4, in case of, for example, forming a class with 15 taps in the horizontal direction, the class classifying technique fetches a data of 15 pixels forming a tap, detects the maximum value and the minimum value of the data, calculates the dynamic range, and thereafter executes the coding by the ADRC.

Figure 5:
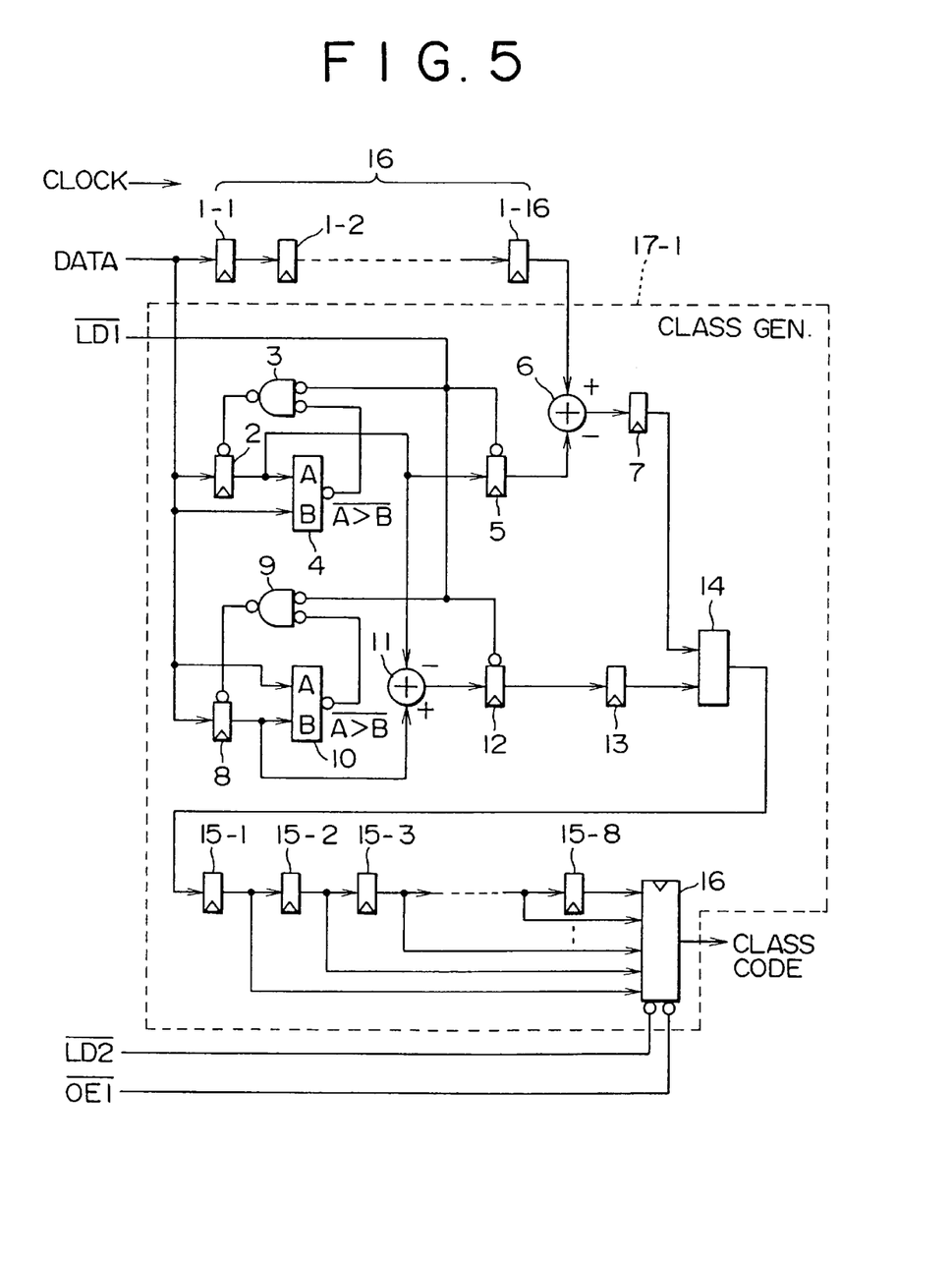
FIG. 5 is a block diagram showing a basic circuit example of the ADRC class generating circuit.

FIG. 5 is a block diagram showing a construction of one example of the ADRC class generating circuit. The ADRC class generating circuit is comprised of registers 1-1 through 1-16 and a class code generating circuit 17-1. Next, the class code generating circuit 17-1 will be described.

In accordance with a clock signal, a data corresponding to the pixel value of one pixel inputted from an input terminal not illustrated, which is hereinafter referred to as a pixel data, is supplied to the register 1-1, and a register 2, comparator 4, register 8, and comparator 10 which constitute the class code generating circuit 17-1. And, a load signal LD1 is supplied to AND gates 3, 9 and registers 5, 12.

And, a load signal LD2 and enable signal OE1 are supplied to a register (class generating circuit) 16. The load signal LD2 and enable signal OE1 are designed such that the levels of the signals become low (L) at every 15th clock.

The pixel data supplied to the register 1-1 are supplied to the register 1-2 in accordance with the clock signal. In the same manner, the pixel data supplied to the register 1-2 are sequentially delayed one clock each in accordance with the clock signal, and are transferred to the register 1-16. The pixel data outputted from the register 1-16 are supplied to an adder 6.

On the other hand, a minimum value MIN is detected by the register 2, comparator 4, and AND gate 3, which is supplied to the register 5. The comparator 4 compares a data supplied to a terminal A thereof through the register 2 with a data supplied to a terminal B thereof; and if the data supplied to the terminal A is larger, the output signal level thereof is made low. The low level signal output from the comparator 4 is supplied as a load pulse to the register 2 through the AND gate 3. Thereby, a new data (pixel data supplied to the terminal B) is taken in and held in the register 2. Finally, in this manner, the minimum pixel data of the 15 pixel data is held in the register 2.

At a timing when the LD1 signal level becomes L, the minimum value MIN held in the register 2 is taken in in the register 5. And, the minimum value MIN is held in the register 5 and supplied to the adder 6. The adder 6 adds a pixel data supplied from the register 1-16 and a data that the sign of the minimum value MIN supplied from the register 5 is inverted; and a data (pixel data—minimum value MIN) as the addition result is supplied to a quantization circuit 14 through a register 7.

And, a maximum value MAX is detected by the register 8, comparator 10, and AND gate 9, which is supplied to an adder 11. The comparator 10 compares, in the same manner as in the comparator 4, a data supplied to a terminal A thereof with a data supplied to a terminal B thereof; and if the data supplied to the terminal A is larger, the output signal level thereof is made low. The low level signal output from the comparator 10 is supplied as a load pulse to the register 8 through the AND gate 9. Thereby, a new pixel data (pixel data supplied to the terminal A) is taken in and held in the register 8. In this manner, finally, the maximum pixel data of the 15 pixel data is held in the register 8.

The adder 11 adds the maximum value MAX supplied from the register 8 and a data that the sign of the minimum value MIN supplied from the register 2 is inverted; and thereby, a dynamic range is calculated. The calculated dynamic range DR is supplied to the register 12 and held therein. The dynamic range DR held in the register 12 is supplied to the quantization circuit 14 through a register 13. The quantization circuit 14 quantizes the pixel data to be supplied to the class generating circuit 16, from the pixel data supplied from the register 7 and the dynamic range DR supplied from the register 13.

The pixel data quantized in the quantization circuit 14 are sequentially supplied to a register 15-1 and transferred to a register 15-8 in accordance with the clock signal. The quantized pixel data held in the registers 15-1 through 15-7 are each transferred to the next registers, and the quantized pixel data held in the register 15-8 are supplied to the class generating circuit 16. In the class generating circuit 16, one class code is generated from the eight pixel data quantized to be outputted.

The quantization circuit 14 is composed of, for example, a ROM (Read Only Memory). In this case, the dynamic range DR supplied from the register 13, data (pixel data—minimum MIN) supplied from the register 7, and the quantization code corresponding to these data are associated each other and stored therein.

Figure 6:
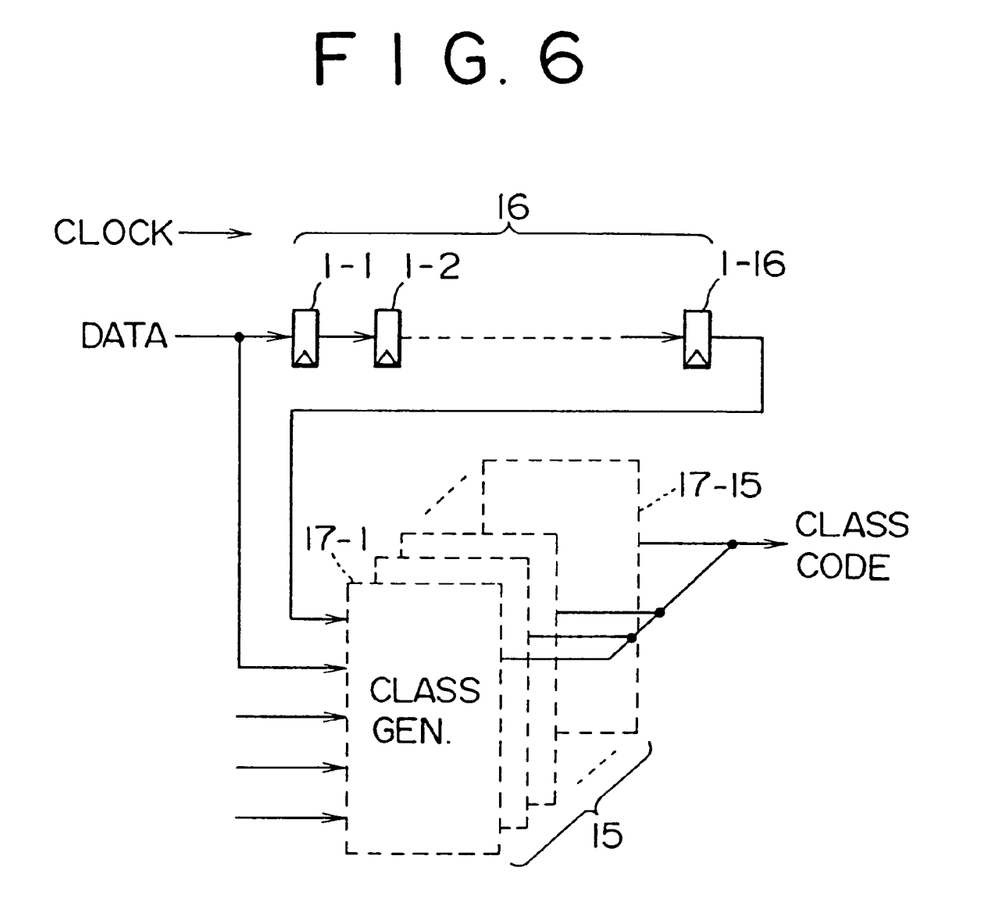
FIG. 6 is a block diagram showing an example of the ADRC class generating circuit arranged in parallel.

However, in the foregoing circuit, to calculate a class code accompanies a delay of more than 30 clocks in the throughput. Further, in order to calculate a class code in real time at each time when the pixel under watch is shifted one by one, as shown in FIG. 6, it is necessary to array 15 class generating circuits in parallel, and to select the class codes to be outputted. Accordingly, the hardware becomes considerably bulky, which is a problem. Especially, the part of the quantization is made up of ROMs, which makes the hardware bulky.

SUMMARY OF THE INVENTION

The present invention has been made in view of the foregoing problems, and it is therefore an object of the invention to simplify the hardware for classifying data into classes without deteriorating accuracy.

A data processing equipment set forth in claim 1 is characterized by comprising storage means for sequentially storing a plurality of data forming the classes, first detection means for sequentially comparing magnitudes of the data stored in the storage means and detecting a maximum value and a minimum value of the data by the tournament system, a second detection means for detecting a dynamic range as the difference between the maximum value and the minimum value of the data obtained by the first detection means, and operation means for operating a plurality of thresholds for quantizing the data in accordance with the dynamic range detected by the second detection means.

A data processing equipment set forth in claim 4 is characterized by comprising comparison means for comparing magnitudes of inputted data and specific reference values and outputting comparison results, and an outputting means for selectively outputting any one of the comparison results outputted from the other comparison means in accordance with a comparison result outputted from a specific one of the comparison means.

A data processing method set forth in claim 5 is characterized by sequentially storing a plurality of data forming classes, sequentially comparing magnitudes of the data stored and detecting maximum values and minimum values of the data by the tournament system, detecting dynamic ranges as differences between the maximum values and the minimum values of the data detected, and operating a plurality of thresholds for quantization in accordance with the dynamic ranges detected.

A data processing method set forth in claim 6 is characterized by comparing magnitudes of inputted data and specific reference values and outputting comparison results, and selectively outputting any one of the other comparison results outputted in accordance with a specific comparison result outputted.

In the data processing equipment set forth in claim 1, storage means sequentially store a plurality of data forming classes, first detection means sequentially compare magnitudes of the data stored in the storage means and detect a maximum value and a minimum value of the data by the tournament system, a second detection means detects a dynamic range as the difference between the maximum value and the minimum value of the data obtained by the first detection means, and operation means operate a plurality of thresholds for quantizing the data in accordance with the dynamic range detected by the second detection means.

In the data processing equipment set forth in claim 4, comparison means compare magnitudes of inputted data and specific reference values and output comparison results, and an outputting means selectively outputs any one of the comparison results outputted from the other comparison means in accordance with a comparison result outputted from a specific one of the comparison means.

In the data processing method set forth in claim 5, a plurality of data forming classes are sequentially stored, magnitudes of the data stored are sequentially compared and maximum values and minimum values of the data are detected by the tournament system, dynamic ranges as differences between the maximum values and the minimum values of the detected data are detected, and a plurality of thresholds for quantization are operated in accordance with the dynamic ranges detected.

In the data processing method set forth in claim 6, magnitudes of inputted data and specific reference values are compared and comparison results are outputted, and any one of the other comparison results outputted are selectively outputted in accordance with a specific comparison result outputted.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENT

Preferred embodiments of the present invention will hereafter be described in detail with reference to the accompanying drawings. Here, in order to define the correspondence between the means set forth in the claims of the invention and the embodiments, a corresponding embodiment (one embodiment, only) will be added in the parentheses following the means.

Figure 1:
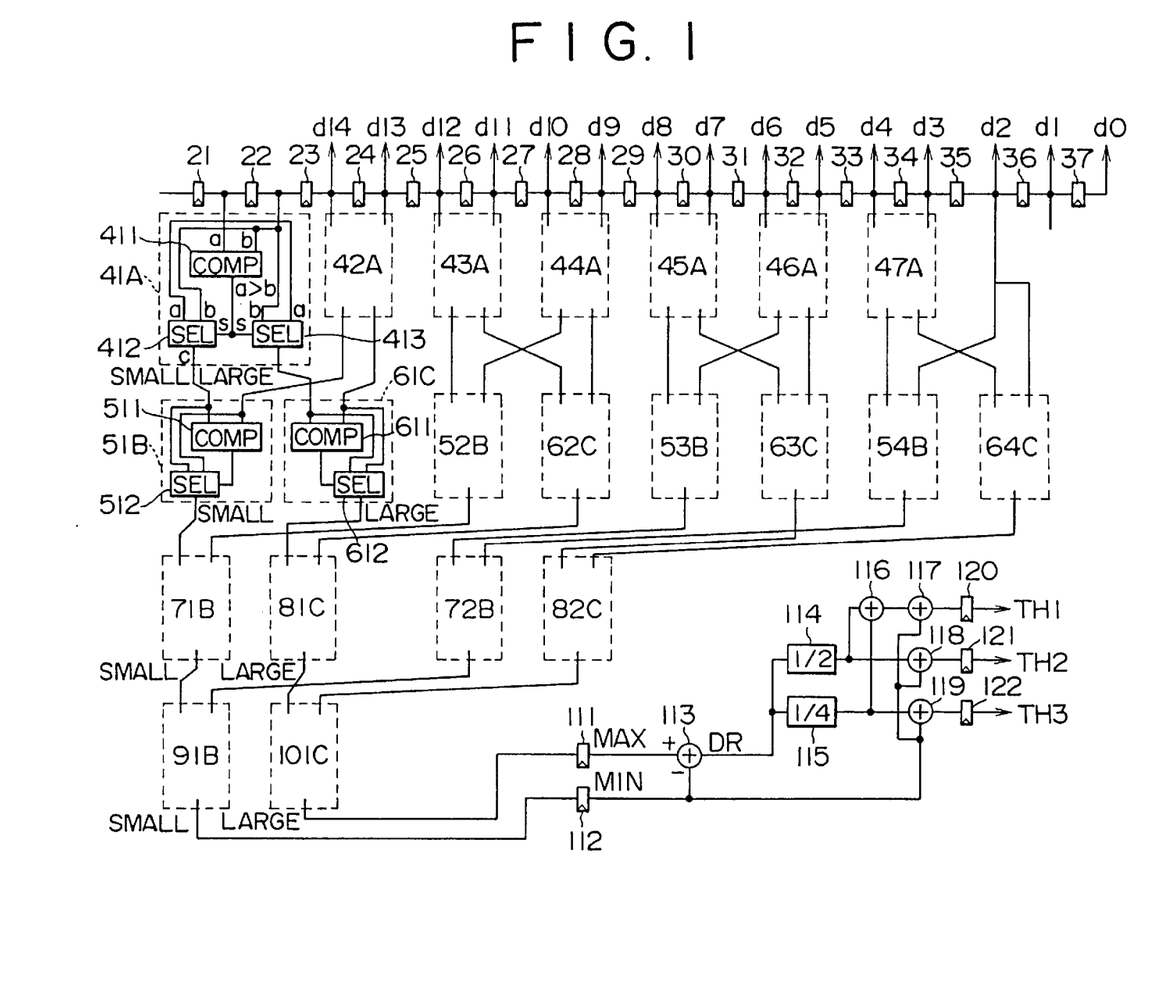
FIG. 1 is a block diagram showing a construction of one embodiment of an ADRC class generating circuit to which the data processing equipment of the present invention is applied.

The data processing equipment of the present invention comprises storage means (for example, registers 21 through 35 in FIG. 1) for sequentially storing a plurality of data to form classes; first detection means (for example, circuit blocks 41A through 47A, circuit blocks 51B through 54B, circuit blocks 61C thorough 64C, circuit blocks 71B, 72B, 81C, 82C, 91B, 101C in FIG. 1) that sequentially compare magnitudes of the data stored in the storage means and detect a maximum value and a minimum value of the data by the tournament system; a second detection means (for example, an adder 113 in FIG. 1) for detecting a dynamic range as the difference between the maximum value and the minimum value of the data acquired by the first detection means; and operation means (for example, shift registers 114, 115, adders 116 through 119 in FIG. 1) for operating a plurality of thresholds for quantizing data in accordance with the dynamic range detected by the second detection means.

The data processing equipment of the present invention further comprises quantization means (for example, quantization circuits 131-1 through 131-15 in FIG. 2) for quantizing data in accordance with the thresholds operated by the operation means; and a class generating means (for example, a register 136 in FIG. 2) for generating classes in accordance with the data quantized by the quantization means.

The data processing equipment of the present invention comprises comparison means (for example, comparators 132-1, 133-1, 134-1, in FIG. 2) for comparing magnitudes of inputted data and specific reference values and outputting comparison results; and an output means (for example, a selector 135-1 in FIG. 2) for selectively outputting any one of the comparison results outputted from the other comparison means in accordance with a comparison result outputted from a specific comparison means.

The additional descriptions in the foregoing parentheses should not be understood that the means are confined to the above-mentioned.

Figure 2:
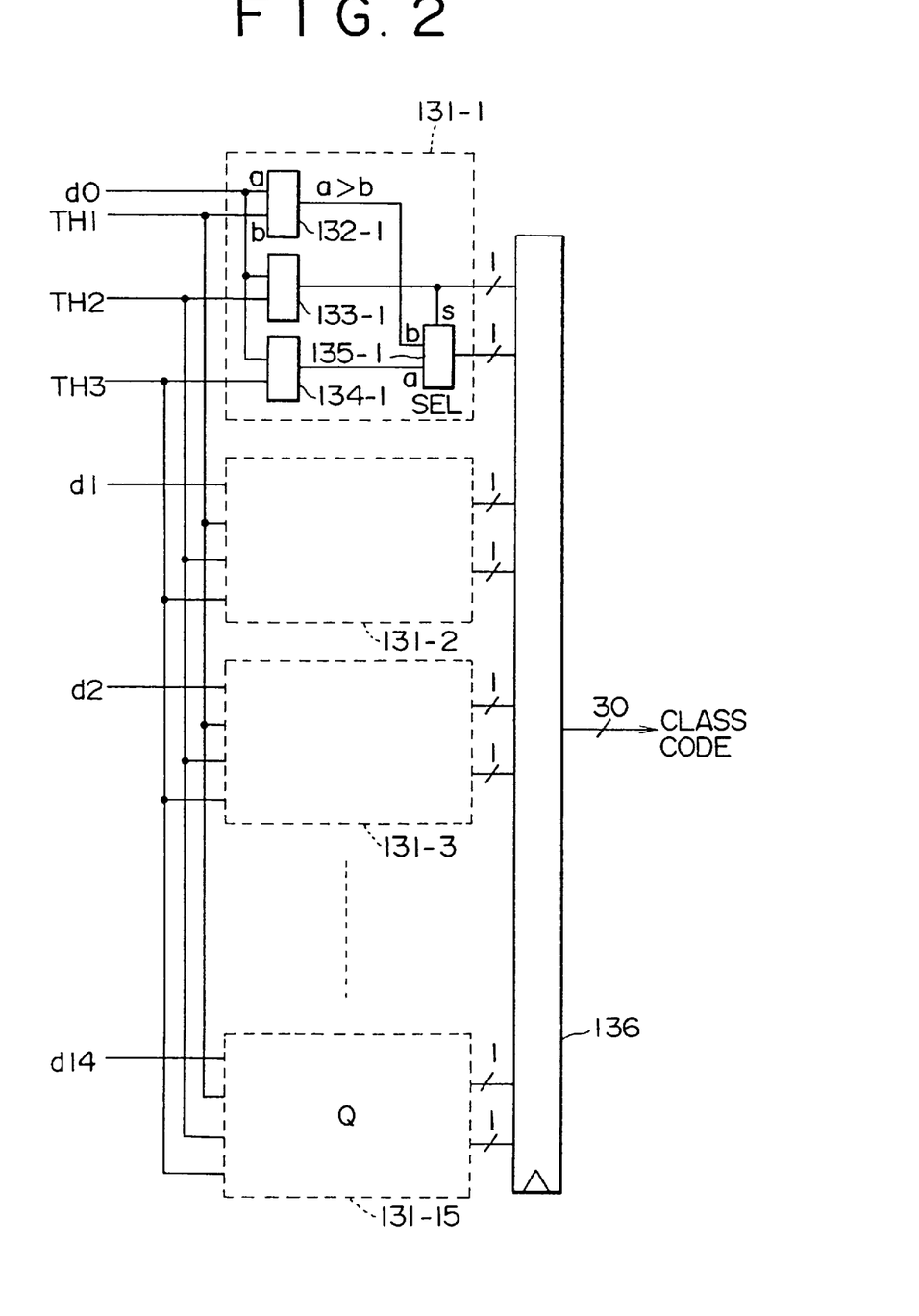
FIG. 2 is a block diagram showing a construction of one embodiment of an ADRC class generating circuit to which the data processing equipment of the present invention is applied.

FIG. 1 and FIG. 2 are block diagrams each showing a construction of one embodiment of an ADRC class generating circuit to which the data processing equipment of the present invention is applied. FIG. 1 is a block diagram of a part for calculating thresholds for quantizing inputted data, and FIG. 2 is a block diagram of a part for quantizing inputted data and generating class codes.

In FIG. 1, the registers 21 through 37 are designed to hold, sequentially for 15 pixels, pixel data corresponding to inputted pixel values. The circuit blocks 41A through 47A are designed to compare the magnitudes between two inputted pixel data, and to output the comparison results.

Each of the circuit blocks 51B through 54B is designed to receive one smaller data of the two pixel data outputted from each of the circuit blocks 41A through 47A and the other smaller data of the two pixel data outputted from another circuit block adjacent to the circuit block giving the foregoing one smaller data, and to output the smaller pixel data of the two. Further, each of the circuit blocks 61C through 64C is designed to receive one larger data of the two pixel data outputted from each of the circuit blocks 41A through 47A and the other larger data of the two pixel data outputted from another circuit block adjacent to the circuit block giving the foregoing one larger data, and to output the larger pixel data of the two.

Each of the circuit blocks 71B, 72B each is designed to receive two data of the pixel data outputted from the circuit blocks 51B through 54B, and to output the smaller pixel data of the two.

Each of the circuit blocks 81C, 82C each is designed to receive two data of the pixel data outputted from the circuit blocks 61C through 64C, and to output the larger pixel data of the two.

The circuit block 91B is designed to receive the pixel data outputted from the circuit blocks 71B, 72B, and to output the smaller pixel data of the two. The circuit block 101C is designed to receive the pixel data outputted from the circuit blocks 81C, 82C, and to output the larger pixel data of the two.

Next, the operation will be described. The registers 21 through 37 hold pixel data corresponding to inputted pixel values sequentially for 15 pixels. The circuit blocks 41A through 47A each compare the magnitudes between two adjacent pixel data, and divide the pixel data into the larger and the smaller.

For example, in a comparator 411 of the circuit block 41A, a pixel data (a) supplied to a terminal a from the register 21 and a pixel data (b) supplied to a terminal b from the register 22 are compared, and a signal (s) corresponding to the comparison result is outputted. On the basis of the comparison result by the comparator 411, a selector 412 outputs the smaller data of the pixel data (a) and the pixel data (b). A selector 413 outputs the larger data of the pixel data (a) and the pixel data (b).

For example, the comparator 411 outputs the signal (s) of the level 1, if the pixel data (a) is larger than the pixel data (b), and outputs the signal (s) of the level 0, if the pixel data (a) is smaller than or equal to the pixel data (b). The selector 412 outputs the pixel data (b) inputted to the terminal b, if the level of the signal (s) supplied from the comparator 411 is 1, and outputs the pixel data (a) inputted to the terminal a, if the level of the signal (s) is 0. The selector 413 outputs the pixel data (a) inputted to the terminal a, if the level of the signal (s) supplied from the comparator 411 is 1, and outputs the pixel data (b) inputted to the terminal b, if the level of the signal (s) is 0.

In the circuit blocks 42A through 47A, in the same manner as above, inputted pixel data are compared of the magnitudes, and divided into the larger and smaller data.

The above-mentioned is the operation of the first hierarchy, and the operation proceeds to the next.

In the next hierarchy, namely, in the circuit blocks 51B through 54B and the circuit blocks 61C through 64C, the magnitudes of the pixel data supplied from the circuit blocks 41A through 47A are compared. In the circuit blocks 51B through 54B, the smaller pixel data are detected; and in the circuit blocks 61C through 64C, the larger pixel data are detected and outputted.

Each of the circuit blocks 51B through 54B is supplied with one smaller data of the two pixel data outputted from each of the circuit blocks 41A through 47A and the other smaller data of the two pixel data outputted from another circuit block adjacent to the circuit block giving the foregoing one smaller data. For example, in the circuit blocks 51B, a comparator 511 compares the magnitude of two smaller pixel data supplied from circuit blocks 41A and the circuit blocks 42A, and on the basis of the comparison result, as elector 512 outputs the smaller pixel data. Each of the circuit blocks 52B through 54B is supplied, in the same manner as above, with the smaller two of the pixel data supplied from the circuit blocks 43A through 47A.

On the other hand, each of the circuit blocks 61C through 64C is supplied with one larger data of the two pixel data outputted from each of the circuit blocks 41A through 47A and the other larger data of the two pixel data outputted from another circuit block adjacent to the circuit block giving the foregoing one larger data. For example, in the circuit blocks 61C, a comparator 611 compares the magnitude of two larger pixel data supplied from circuit blocks 41A and the circuit blocks 42A, and on the basis of the comparison result, a selector 612 outputs the larger pixel data. Each of the circuit blocks 62C through 64C is supplied, in the same manner as above, with the larger two of the pixel data supplied from the circuit blocks 43A through 47A.

The above-mentioned is the operation of the second hierarchy, and the operation proceeds to the next.

In the next hierarchy, namely, in the circuit blocks 71B, 72B, 81C, 82C, the magnitudes of the pixel data supplied from the circuit blocks 51B through 54B and the circuit blocks 61C through 64C are compared. In the circuit blocks 71B, 72B, the smaller pixel data are detected; and in the circuit blocks 81C, 82C, the larger pixel data are detected and outputted.

For example, in the circuit block 71B, a pixel data supplied from the circuit block 51B and a pixel data supplied from the circuit block 52B are compared, and the smaller one is outputted. In the circuit block 72B, a pixel data supplied from the circuit block 53B and a pixel data supplied from the circuit block 54B are compared, and the smaller one is outputted.

Further, in the circuit block 81C, a pixel data supplied from the circuit block 61C and a pixel data supplied from the circuit block 62C are compared, and the larger one is outputted. In the circuit block 82C, a pixel data supplied from the circuit block 63C and a pixel data supplied from the circuit block 64C are compared, and the larger one is outputted.

The above-mentioned is the operation of the third hierarchy, and the operation proceeds to the next.

In the next hierarchy, namely, in the circuit blocks 91B and 101C, two pixel data from the circuit blocks 71B and 72B are supplied to the circuit block 91B to detect and output the smaller picture data, and two pixel data from the circuit blocks 81C and 82C are supplied to the circuit block 101C to detect and output the larger picture data.

The circuit block 91B is supplied with a pixel data from the circuit block 71B and a pixel data from the circuit block 72B to compare the magnitude of the two and output the smaller pixel data. The circuit block 101C is supplied with a pixel data from the circuit block 81C and a pixel data from the circuit block 82C to compare the magnitude of the two and output the larger pixel data.

Thus, by the tournament system, the maximum value and the minimum value of the pixel data supplied from the registers 21 through 35 are each detected.

The minimum value of the pixel data outputted from the circuit block 91B is supplied to a register 112 to be stored therein. The maximum value of the pixel data outputted from the circuit block 101C is supplied to a register 111 to be stored therein.

The pixel data stored in the register 111 and a data that the pixel data stored in the register 112 is inverted in polarity are supplied to the adder 113. The adder 113 adds the pixel data supplied from the register 111 and a data that the pixel data supplied from the register 112 is inverted in polarity, thus operating the difference of the maximum value and the minimum value, namely, the dynamic range DR of the pixel data.

The dynamic range DR operated in the adder 113 is supplied to the shift register 114 and 115. The shift register 114 shifts the pixel data for one bit only in the lower digit direction, thereby obtaining a half value thereof.

The shift register 115 shifts the pixel data for two bits only in the lower digit direction, thereby obtaining a quarter value thereof.

A value outputted from the shift register 114 and a value outputted from the shift register 115 are added in the adder 116; and this added value and the minimum value of pixel data outputted from the register 112 are added in the adder 117 and the added value is supplied to a register 120 to be stored. This value is served as a threshold (TH1) for quantizing pixel data.

A value outputted from the shift register 114 and the minimum value of pixel data outputted from the register 112 are added in the adder 118; and the added value is supplied to a register 121 to be stored. This value is served as a threshold (TH2) for quantizing pixel data.

Further, a value outputted from the shift register 115 and the minimum value of pixel data outputted from the register 112 are added in the adder 119; and the added value is supplied to a register 122 to be stored. This value is served as a threshold (TH3) for quantizing pixel data.

This embodiment applies the quantization by the two bit ADRC, for simplicity, as described later with reference to FIG. 3. To express the thresholds TH1 through TH3 into equations will give the equations (1) through (3) as follows.

$$TH1 = DR/2 + DR/4 + MIN \quad \text{(equation 1)}$$
$$TH2 = DR/2 + MIN \quad \text{(equation 2)}$$
$$TH3 = DR/4 + MIN \quad \text{(equation 3)}$$

FIG. 2 is a block diagram showing a construction of a part that executes quantization and class code generation in the ADRC class generating circuit. The ADRC class generating circuit is comprised of the quantization circuits 131-1 through 131-15 and the register 136. The quantization circuit 131-1 is comprised of the comparators 132-1, 133-1, 134-1 and the selector 135-1.

The comparators 132-1, 133-1, 134-1 are supplied with a pixel data d 0 outputted from the register 37. Further, the comparator 132-1 is supplied with the threshold TH1 already operated, the comparator 133-1 is supplied with the threshold TH2, and the comparator 134-1 is supplied with the threshold TH3.

The comparator 132-1 compares the inputted pixel data d 0 and the threshold TH1, and if the pixel data d 0 is larger than the threshold TH1, the comparator 132-1 is designed to output a signal of H level; and if the pixel data d 0 is smaller than or equal to the threshold TH1, it is designed to output a signal of L level. In the same manner as above, the comparator 133-1 compares the inputted pixel data d 0 and the threshold TH2, and if the pixel data d 0 is larger than the threshold TH2, the comparator 133-1 is designed to output a signal of H level; and if the pixel data d 0 is smaller than or equal to the threshold TH2, it is designed to output a signal of L level. Further, the comparator 134-1 compares the inputted pixel data d 0 and the threshold TH3, and if the pixel data d 0 is larger than the threshold TH3, the comparator 134-1 is designed to output a signal of H level; and if the pixel data d 0 is smaller than or equal to the threshold TH3, it is designed to output a signal of L level.

And, the selector 135-1 selectively outputs a signal inputted to a terminal b, outputted from the comparator 132-1, if the output signal of the comparator 133-1 is H level, namely, if the pixel data d 0 is larger than the threshold TH2. On the other hand, if the output signal of the comparator 133-1 is L level, namely, if the pixel data d 0 is smaller than or equal to the threshold TH2, the selector 135-1 selectively outputs a signal inputted to a terminal a, outputted from the comparator 134-1.

First, if the output signal from the comparator 133-1 is H level, namely, if the pixel data d 0 is larger than the threshold TH2, the comparator 133-1 outputs "1". And, in that case, the selector 135-1 selectively outputs the signal inputted to the terminal b, namely the output signal from the comparator 132-1. The comparator 132-1 outputs H level, "1", if the pixel data d 0 is larger than the threshold TH1. Further, if the pixel data d 0 is smaller than or equal to the threshold TH1, the comparator 132-1 outputs L level, "0".

Therefore, the quantization circuit 131-1 outputs two bit data "11", if the pixel data d 0 is larger than the threshold TH1; and the quantization circuit 131-1 outputs two bit data "10", if the pixel data d 0 is smaller than or equal to the threshold TH1 and larger than the threshold TH2.

Next, if the output signal from the comparator 133-1 is L level, namely, if the pixel data d 0 is smaller than or equal to the threshold TH2, the comparator 133-1 outputs "0". And, in that case, the selector 135-1 selectively outputs the signal inputted to the terminal a, namely the output signal from the comparator 134-1. The comparator 134-1 outputs H level, "1", if the pixel data d 0 is larger than the threshold TH3. Further, if the pixel data d 0 is smaller than or equal to the threshold TH3, the comparator 134-1 outputs L level, "0".

Therefore, the quantization circuit 131-1 outputs two bit data "01", if the pixel data d 0 is smaller than or equal to the threshold TH2 and larger than the threshold TH3; and the quantization circuit 131-1 outputs two bit data "00", if the pixel data d 0 is smaller than or equal to the threshold TH3.

In this manner, the pixel data are encoded and converted into two bit quantizated values.

The construction and operation of the quantization circuits 131-2 through 131-15 is the same as those of the quantization circuit 131-1, and the description of these will be omitted; these quantization circuits also output two bit data in accordance with the inputted pixel data d 1 through d 14 and the thresholds TH1 through TH3.

Figure 3:
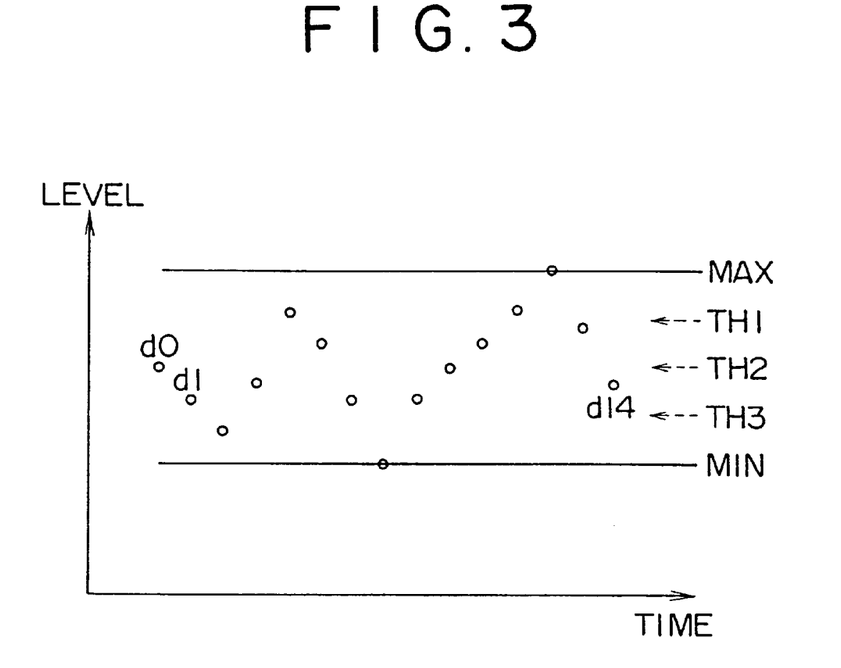
FIG. 3 is a chart showing a relation between the pixel data d 0 through d 14 and the thresholds TH 1 through TH 3.

FIG. 3 illustrates an aspect in which the pixel data d 0 through d 14 are quantized in accordance with the thresholds TH1 through TH3 by the two bit ADRC. In this case, for example, the pixel data d 0 is smaller than or equal to the threshold TH2 and larger than the threshold TH3; and therefore, the pixel data d 0 is quantized into "01" as mentioned above. Further, the pixel data d 2 (the third one from the left) is smaller than or equal to the threshold TH3, and quantized into "00". The pixel data d 4 (the fifth one from the left) is larger than the threshold TH1, and quantized into "11". The pixel data d 5 (the sixth one from the left) is smaller than or equal to the threshold TH1 and larger than the threshold TH2, and quantized into "10".

Next, the output data (two bit quantized values) from the quantization circuits 131-1 through 131-15 are supplied to the register 136. And, the quantization code of 30 (=15×2) bits formed of these two bit quantized data is finally integrated into a class code to be outputted.

Thus, configuring the quantization circuits 131-1 through 131-15 as described above facilitates to generate the ADRC class codes and reduces the scale of the gates, and the circuit configuration will better suit for being integrated into an LSI.

The differences between the ADRC class generating circuit and the circuit of this embodiment can be cited, for reconfirmation, as follows. First, the method of detecting the maximum value and minimum value of the pixel data is changed from the parallel system into the sequential tournament system. Secondly, the method of making up the quantization circuit is changed from array of ROMs into synthesis of logics.

Accordingly, when forming the class classification technique employing the ADRC into a hardware, these points will serve to simplify the hardware.

Further, in the foregoing embodiment, the two bit ADRC is applied to the quantization executed in the quantization circuits 131-1 through 131-15; however, one bit or more than three bit ADRC can be applied.

Further, in the foregoing embodiment, the thresholds TH1 through TH3 are operated by adding a half value and a quarter value of the difference between the maximum value and the minimum value of the pixel data on the minimum value; however, the thresholds TH1 through TH3 can be operated by subtracting a half value and a quarter value of the difference between the maximum value and the minimum value of the pixel data from the maximum value.

Further, the foregoing embodiment describes a case of processing pictorial image signals, however, it is not confined to pictorial image signals and the invention can be applied to a case of processing the other signals such as audio signals.

According to the data processing equipment set forth in claim 1 and the data processing method set forth in claim 5, a plurality of data forming classes are sequentially stored, the magnitudes of the stored data are sequentially compared, the maximum value and the minimum value of the data are detected by the tournament system, the dynamic range as the difference between the maximum value and the minimum value of the detected data is detected, and a plurality of the thresholds for quantization are operated on the basis of the detected dynamic range; and therefore, employing a simple hardware can achieve a class classification.

According to the data processing equipment set forth in claim 4 and the data processing method set forth in claim 6, the magnitudes of the inputted data and specific reference values are compared, the compared results are outputted, and on the basis of the outputted specific comparison result, any one of the other outputted comparison results are selectively outputted; and therefore, employing a simple hardware can carry out quantization.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data processing equipment for classifying inputted data into classes in accordance with peripheral data of the inputted data, and for processing the data for each of the classes, the data processing equipment comprising:

storage means for sequentially storing a plurality of data forming the classes;

first detection means for sequentially comparing magnitudes of the data stored in the storage means and simultaneously detecting a maximum value and a minimum value of the data by a tournament system;

second detection means for detecting a dynamic range as a difference between the maximum value and the minimum value of the data obtained by the first detection means; and operation means for operating a plurality of thresholds for quantizing the data in accordance with the dynamic range detected by the second detection means, said operation means simultaneously generating a plurality of quantization codes, one for each of said plurality of data in accordance with said plurality of thresholds and generating a class code in accordance with said plurality of quantization codes.

2. The data processing equipment as claimed in claim 1, wherein the operation means operate a plurality of the thresholds by a shifting operation and an adding operation.

3. The data processing equipment as claimed in claim 1, wherein the data processing equipment further comprises:

quantization means for quantizing the data in accordance with the thresholds operated by the operation means; and class generation means for generating the classes in accordance with quantization results in which the data are quantized by the quantization means.

4. The data processing method of claim 1, wherein a second inputted data is generated by inputting a new portion of data and removing an old portion of data from said storage means, at least a portion of said original input data being maintained in said storage means, and a new class code is generated.

5. The data processing equipment of claim 1, wherein a second inputted data is generated by inputting a new portion of data and removing an old portion of data from said storage means, at least a portion of said original input data being maintained in said storage means, and a new class code is generated.

6. A data processing method that classifies inputted data into classes in accordance with peripheral data of the inputted data, and processes the data for each of the classes, comprising the steps of:

sequentially storing a plurality of data forming the classes;

sequentially comparing magnitudes of the data stored and simultaneously detecting a maximum value and a minimum value of the data by a tournament system;

detecting a dynamic range as a difference between the maximum value and the minimum value of the data detected;

operating a plurality of thresholds for quantization in accordance with the dynamic range detected;

simultaneously generating a plurality of quantization codes one for each of said plurality of data in accordance with said plurality of thresholds; and generating a class code in accordance with said plurality of quantization codes.

7. A data processing apparatus for classifying a first set of input data into classes in accordance with peripheral data of the input data, and for processing the data for each of the classes, comprising:

storage means for sequentially storing a plurality of data forming the classes;

first detection means for sequentially comparing magnitudes of the data stored in the storage means and simultaneously detecting a maximum value and a minimum value of the data by a tournament system;

second detection means for detecting a dynamic range as a difference between the maximum value and the minimum value of the data obtained by the first detection means;

threshold defining means for defining various quantization thresholds within said dynamic range;

a plurality of quantization generating circuits, each for simultaneously generating a quantization code for each one of said plurality of data in accordance with said quantization thresholds; and class generation means for generating a class code in accordance with said plurality of quantization codes;

wherein a class code for a next set of input data including only one of said plurality of data different from said first set of input data can be determined after only inputting said new one of said plurality of data to said storage means, removing one of said plurality of data comprising said first set of input data.

8. A data processing method wherein an apparatus for classifying a first set of input data into classes in accordance with peripheral data of the input data, and for processing the data for each of the classes, comprising:

sequentially storing a plurality of data forming the classes;

sequentially comparing magnitudes of the data stored in the storage means and simultaneously detecting a maximum value and a minimum value of the data by a tournament system;

detecting a dynamic range as a difference between the maximum value and the minimum value of the data obtained by the first detection means;

defining various quantization thresholds within said dynamic range;

simultaneously generating a quantization code for each one of said plurality of data in accordance with said quantization thresholds; and generating a class code in accordance with said plurality of quantization codes;

wherein a class code for a next set of input data including only one of said plurality of data different from said first set of input data can be determined after only inputting said new one of said plurality of data to said storage means, removing one of said plurality of data comprising said first set of input data.

* * * * *